March 20, 1928.
C. S. SNAVELY
LIGHT SIGNAL
Filed July 20, 1923
1,662,987
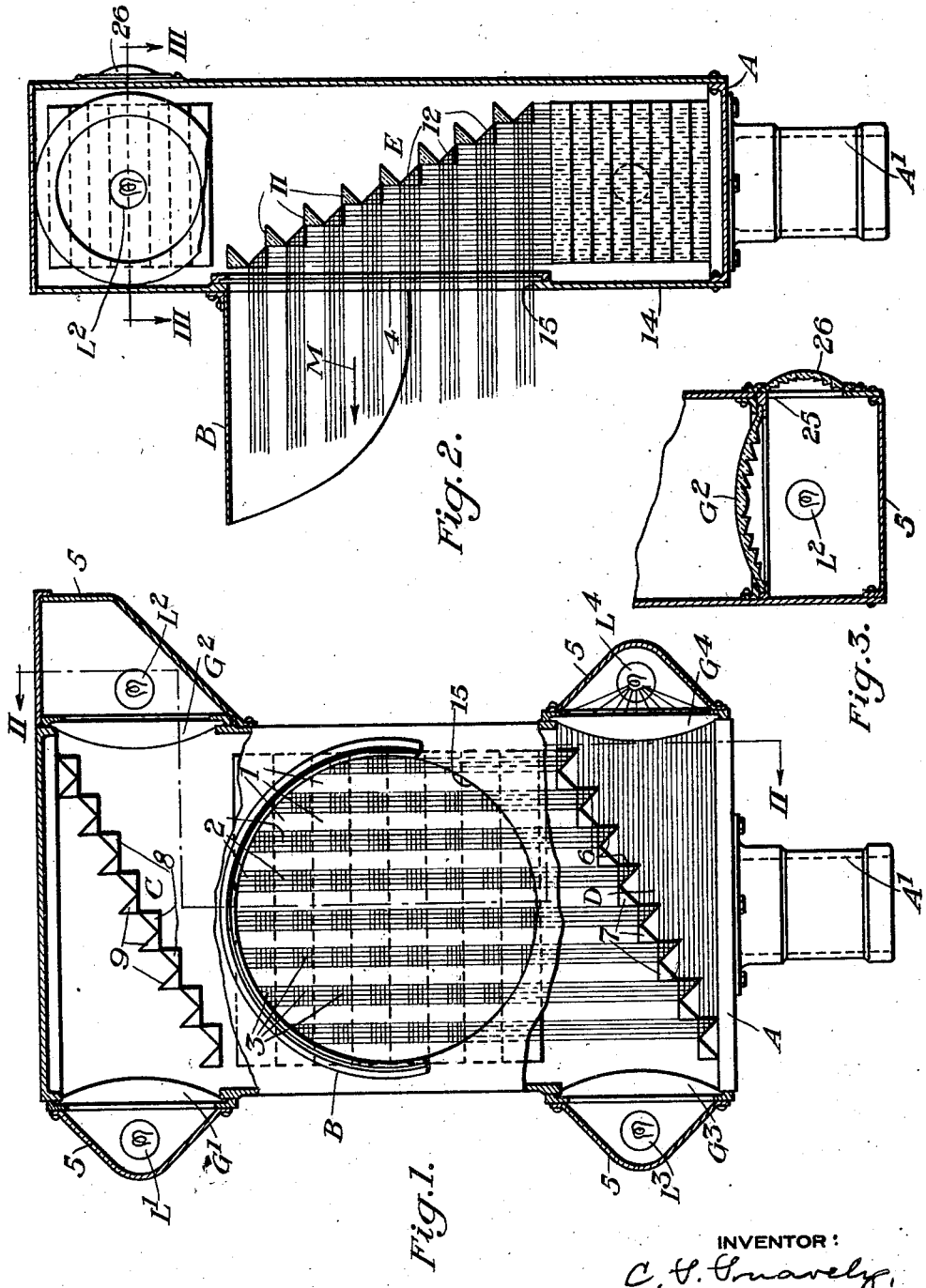

Patented Mar. 20, 1928.

1,662,987

UNITED STATES PATENT OFFICE.

CLARENCE S. SNAVELY, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

LIGHT SIGNAL.

Application filed July 20, 1923. Serial No. 652,717.

My invention relates to light signals.

I will describe one form of light signal embodying my invention, and will then point out the novel features thereof in claims.

In the accompanying drawing Fig. 1 is a front view, with parts of the enclosing casing broken away, showing one form of signal embodying my invention. Fig. 2 is a sectional view on the line II—II of Fig. 1. Fig. 3 is a sectional view on the line III—III of Fig. 2.

Similar reference characters refer to similar parts in each of the views.

Referring to the drawing, the signal comprises a casing A of some suitable material such as cast iron, which casing is provided with a socket A' for mounting, as upon a mast. Supported in suitable housings 5 near the top of the casing A are two light sources such as incandescent lamps $L^2$ and $L'$. Two similar lamps $L^3$ and $L^4$ are supported in similar housings 5 near the bottom of the casing A.

Each of the lamps $L'$, $L^2$, $L^3$ and $L^4$ is provided with means for projecting a beam of parallel rays from the lamp into the casing A. As shown in the drawing this means comprises a simple lens designated by the reference character G with an exponent corresponding to the location and so located that the filament of the associated lamp lies at the focus of the lens. Alternative forms of collimating devices, such as parabolic reflectors or doublet lenses, may be substituted for the single lens structure here shown.

The front plate 14 of casing A is provided with an aperture 15 through which the signal indication is displayed. This aperture is provided with a plane uncolored cover glass 4 adapted to protect the parts of the signal contained in the casing from weather and foreign matter. Supported by front plate 14 and partially surrounding aperture 15 is a forwardly projecting hood B, which shields the cover glass 4 from the direct rays of the sun and thereby eliminates surface reflections, and also shields the cover glass from snow.

A light deflecting device C is provided for lamps $L'$ and $L^2$ and comprises, as here shown, two series of bar prisms 8 and 9 supported by a suitable frame not shown in the drawing. The two sets of prisms 8 and 9 are alternately disposed and are so proportioned and arranged that light originating at lamp $L'$ and projected in parallel rays by lens $G'$ is redirected by prisms 9 of device C toward the bottom of the casing A. In similar fashion light originating at lamp $L^2$ and projected in parallel rays by lens $G^2$ is redirected toward the bottom of the casing A by prisms 8 of device C. As best shown in Fig. 1 the prisms 8 and 9 are spaced apart in a direction parallel to the direction in which light is incident upon them and the result is that the portion of light redirected by each prism is projected downwardly in spaced relation to the portions of light redirected by the adjacent prisms of the same series. Light will therefore be projected downward by these sets of prisms in spaced bands of light, roughly rectangular in cross section. Lamps $L^3$ and $L^4$ are provided with a light-deflecting device D similar in all respects to the light deflecting device C and comprising a series of prisms 7 for redirecting light from lamp $L^3$ upward toward the top of the casing A, and a second series of prisms 6 for projecting light from lamp $L^4$ upward toward the top of casing A. The prisms 6 and 7 of device D are spaced and proportioned in the same manner as prisms 8 and 9 of device C.

A third light deflecting device E is arranged immediately behind cover glass 4 and comprises a series of prisms 11 so disposed as to project through the cover glass 4 in the direction of arrow M light incident upon these prisms from device C. The device E comprises in addition a series of prisms 12 so arranged as to project through the cover glass 4 in the direction of arrow M, light incident upon these prisms from device D. It will be observed that the spacing of prisms 11 and 12 is similar to the spacing of prisms 8 and 9 of device C and prisms 6 and 7 of device D. It follows that each band of light incident upon device E from device D or device C is broken up into a plurality of beams whose cross section is substantially square. The beam of light projected from the signal is therefore, as shown in Fig. 1, made up of a plurality of illuminated squares 3 spaced by horizontal and vertical dark bands 2 and 1, respectively. Due to halation, however, this beam has the appearance of a solid beam of light, especially when viewed from a point at a considerable distance from the signal.

Signals embodying my invention are particularly adapted for, though, in no way limited to, use in connection with railway signaling systems. When used for this purpose lamps L', L², L³, and L⁴ are controlled any suitable means so that only one lamp is energized at a time. Means are also provided for imparting a distinctive color to the shaft of light projected from cover glass 4 by each of the lamps L', L², L³, and L⁴. As shown in the drawing this is accomplished by making the lenses G of distinctively colored glass. For example, lens G' could be yellow glass, lens G² red glass, lens G⁴ green glass, and lens G³ of uncolored glass, thus giving four distinctive indications corresponding to the four different colors of the lenses.

Although I have described the light deflecting devices C, D and E as each comprising a plurality of prisms, it is understood that any light deflecting structure such as silvered mirrors or polished metal could be used though I prefer the prismatic arrangement here shown.

Under certain conditions it is desirable that an observer stationed at a point in rear of the signal, as for example, on a train which has passed the signal moving in the direction in which the signal governs traffic, be able to ascertain whether or not a particular signal indication is being displayed. Thus if the lamp L² associated with the red lens G² is understood in accordance with railway signaling practice to indicate "stop" when energized, this would be the lamp whose condition it is desirable to observe from the rear. As best shown in Figs. 2 and 3, this is accomplished by providing the rear wall of housing 5 containing lamp L² with an aperture 25 in which is inserted a lens 26. This aperture is so disposed that when lamp L² is lighted a beam of light is projected through aperture 25 in a direction opposite to that indicated by the arrow M, and this beam will be visible from the rear of the signal for the purposes specified.

Although I have herein shown and described only one form of signal embodying my invention, it is understood that various changes and modifications may be made therein within the scope of the appended claims without departing from the spirit and scope of my invention.

Having thus described my invention, what I claim is:

1. A signal comprising two oppositely disposed light sources, a series of light deflectors for one said source, a similar series of light deflectors for the other said source, the deflectors of one series being alternately disposed with respect to the deflectors of the other series, and the said two series being arranged to project beams from said two sources in one and the same path, and light deflecting means interposed in the path of light projected from said deflectors and arranged to deflect said two beams in a given new direction.

2. A signal comprising two oppositely disposed light sources, a series of light deflectors for projecting light from one said source along a given path, a similar series of light deflectors for projecting light from the other source along the same path, the deflectors of one series being alternately disposed with respect to the deflectors of the other series, light bending means interposed in the beams of light projected from said deflectors for projecting both said beams in the same new direction, and collimating means interposed between each said source and the associated light deflectors.

3. A signal comprising two oppositely disposed light sources, alternately disposed light deflectors for projecting a beam of light from each said source respectively in the same direction and in the same path, and light bending means interposed in the path of such projected light for projecting said beams in the same new direction.

4. A signal comprising two oppositely disposed light sources, alternately disposed light deflectors for projecting light from each said source respectively in the same direction along a given path, two other oppositely disposed light sources, alternately disposed light deflectors for projecting light from each of said second sources respectively in the same direction along said given path, the direction of light projected from said first two sources being opposite the direction of light projected from said second two sources, and light deflecting means interposed in the path of such projected light.

5. A signal comprising two series of light deflectors, the deflectors of one series being alternately disposed with respect to the deflectors of the other series, four light sources, means for projecting light from either one of two said sources to one said series of deflectors, and means for projecting light from either of the remaining said sources to the remaining series of deflectors.

6. A signal comprising two series of light deflectors, the deflectors of one series being alternately disposed with respect to the deflectors of the other series, four light sources, collimating means associated with each source, means for projecting light from either one of two said sources to one said series of deflectors, and means for projecting light from either of the remaining said sources to the remaining series of deflectors.

7. A signal comprising two series of light deflectors, the deflectors of one series being alternately disposed with respect to the deflectors of the other series, four light sources, means for projecting light from either one of two said sources to one said series of deflectors, means for projecting light from either of the remaining said sources to the remaining series of deflectors, and means for imparting a distinctive color to the light issuing from each said source.

8. A signal comprising a plurality of light sources, means for projecting light from each said source in parallel rays, means for redirecting said rays upon a common area, and light deflecting means at said common area for projecting such rays from each said source in one and the same direction.

9. A signal comprising two oppositely disposed light sources, a series of prisms for one said source, a series of prisms for the other said source the prisms of one said series being alternately disposed with respect to the prisms of the other series, and said two series being arranged to deflect light from said two sources respectively upon a common area, and a third series of prisms at right angles to said first two series and located in said common area.

10. A signal comprising two oppositely disposed light sources arranged to project first and second beams in opposite directions along one and the same path, two sets of deflectors located in said path for projecting said two beams respectively in one and the same path and direction at right angles to the first path, two other oppositely disposed light sources arranged to project third and fourth beams in opposite directions along one and the same third path parallel to the first path, two additional sets of deflectors located in said third path for projecting said third and fourth beams in one and the same direction along said second path but in a direction opposite to that of said first and second beams, and two sets of deflectors located in said second path for projecting all four of said beams in the same direction along a fourth path at right angles to said second path.

11. A signal comprising two pairs of light sources having collimating and coloring means associated therewith and the two sources of each pair being oppositely disposed, a light deflecting device interposed in the beams from the two sources of each pair and each comprising two alternately disposed series of prisms, a third light deflecting device interposed in the beams projected from said first two devices and comprising two alternately disposed series of prisms arranged at right angles with respect to the prisms in said first two series.

12. A signal comprising two series of prisms, the prisms of one series being oppositely disposed with respect to the prisms of the other series and alternating in position therewith, two pairs of light sources, means for projecting light from either source of one pair to one said series of prisms, means for projecting light from either source of the other pair to the remaining series of prisms, and means for distinctively coloring the light issuing from each said source.

In testimony whereof I affix my signature.

CLARENCE S. SNAVELY.